Sept. 24, 1963 S. LOEWE 3,104,842

REEL SUPPORT FOR MAGNETIC RECORDING TAPES

Filed Oct. 21, 1959

Inventor:

Siegmund Loewe

United States Patent Office 3,104,842
Patented Sept. 24, 1963

3,104,842
REEL SUPPORT FOR MAGNETIC RECORDING TAPES

Siegmund Loewe, Yonkers, N.Y.; Bernard Loewe, executor of said Siegmund Loewe, deceased Filed Oct. 21, 1959, Ser. No. 847,781
3 Claims. (Cl. 242—55.11)

The present invention relates to improvements in means for rotatably supporting reels of magnetic recording tape.

Figure 1:
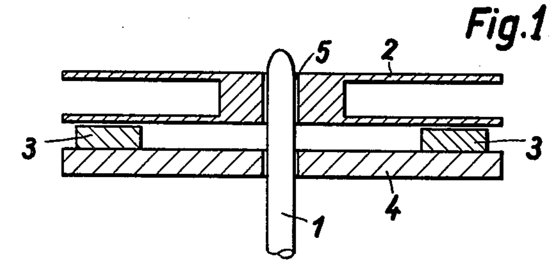
FIG. 1 is a elevation partially in section of a known reel support.

In devices containing reels for magnetic recording tapes to be placed on a preferably vertical fixed or rotating shaft, said reels can be placed as shown in principle in FIG. 1 of the attached drawing: In this drawing 1 is a fixed or rotating shaft, of a magnetic tape recorder, onto which a tape-holding reel 2 is to be placed. In many cases this tape-holding reel rests on a continuous annular friction layer 3, which may also consist of several supporting pieces in one plane, e.g. three individual layers. The layer 3 is fitted, in turn, on a fixed or rotating carrying plate 4. In the case of such designs the reel 2 has a central hole 5, which takes the form of a bore and which fits the circumferential outer surface of shaft 1 practically without play. Since this central hole 5 has a limited extension in the longitudinal direction of shaft 1, the position of the plane of the spool depends on this shaft direction. It is known that the generally used reels of plastic or similar material have certain tolerances in the reel dimensions, as the reel flanges consist of a thin material having a relatively large area, these tolerances being attributable partly to unavoidable irregularities in manufacture and partly to mechanical deterioration during use. As a result of these tolerances in shape it may occur that one or both of the reel flanges are not in an accurately vertical plane to the central hole. The consequence is that by keeping the central hole 5 of reel 2 in axial position there is an irregularity at those parts which determine the horizontal position of the reel so that there is a "wobble" when the reel rotates.

Similar undesirable effects in the rotation of the reel are possible when the supporting surface determining the horizontal position of the reel is not exactly vertical to the shaft axis. This may be attributable e.g. to irregularities in the shape or in the elasticity of the supporting materials, e.g. the layers 3 (FIG. 1).

The said disadvantages of the known magnetic tape sound record apparatus are overcome by the present invention which is directed to means for placing a tape reel with a central hole onto the top of a vertical shaft which projects through said central hole and wherein said reel lies on a flat plate arranged perpendicularly to said shaft, and friction layers are provided between said reel and said plate. According to the invention said means comprise in combination: a cone-shaped central hole profile in said reel the smaller diameter of which corresponds with the shaft diameter and lies in the direction of the upper end of said shaft, and a coupling part with a bell-shaped upper surface arranged on said shaft near its upper end, the cone-shaped inner wall of said central hole lying on the bell-shaped upper surface of said coupling part of said shaft.

Figure 2:
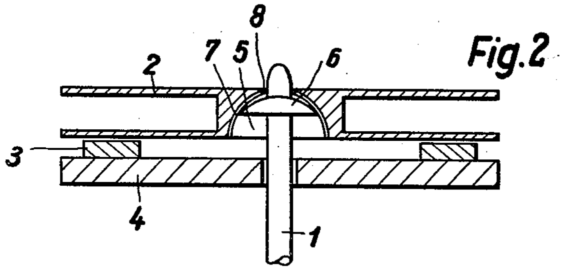
FIG. 2 is an elevation partially in section of a form of the invention.
Figure 3:
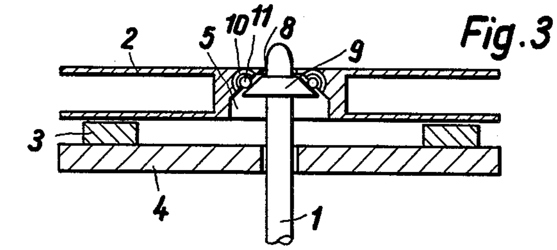
FIG. 3 is an elevation partially in section of a modification of the invention.

Examples of the invention are described in FIGS. 2 and 3 of the accompanying drawing in the form of sections of a magnetic tape reel which is placed on the top end of a vertical shaft. According to this FIG. 2 a ball segmental shaped coupling part 6 is arranged at the end of the shaft 1 which is supposed to be fixed. The central hole 5 of the placed-on reel 2 is widened in such a way that the surface of its inner wall 7 is ball segmental shaped and is fitted to the ball segmental collar 6. Thereby the position of the plane of the reel during operation becomes independent of the axial direction of shaft 1 and the plane of the reel will depend only on the position determined by the carrying disc 4 and its friction layer 3. In order to avoid that the tolerance in the angular adjustment between the plane of the reel and the shaft axis, which is realized by the form of the central hole 5, does not affect at the same time the centering of the reel 2, it is advisable to narrow the central hole 5 towards the top so that at the point 8 the diameter of the hole corresponds practically to the diameter of the shaft 1 without play.

According to FIG. 3 a conical coupling part 9 is frusto-conical shaped and provided at the top of the shaft 1 and the central hole 5 of the reel 2 is designed with a ring of balls 10 in its wall facing the outer surface of the part 9, the balls 11 running on the surface of said part 9. Also in this case the diameter at the top of the central hole 5 at the point 8 leaves no play between the top of the central hole 5 and the shaft 1 so that the centering by the clearance enabling the various angular positions between shaft and spool is not affected.

What I claim is:

1. In a magnetic tape recording apparatus comprising a non rotatable vertical shaft with a tapered coupling part, a tape reel with a central tapered hole, a supporting disc and a friction layer, said supporting disc being freely rotatable on said shaft and bearing said friction layer on the upper side, said coupling part of said shaft being designed as a ball segmental collar decreasing in diameter toward the uper end of said shaft, said hole of said tape reel being equally ball segmental shaped and fitted to said collar surface and said supporting disc together with said friction layer being engageable with said tape reel.

2. In a magnetic tape recording apparatus comprising a non rotatable vertical shaft, a coupling part encircling said shaft, a tape reel with a central hole, a supporting disc and a friction layer, said coupling part and said central hole each having a shape of such form as to balance said tape reel with respect to said supporting disc, said disc being freely rotatable on said shaft and carrying said friction layer on its upper side.

3. In a magnetic tape sound recording apparatus comprising a non rotatable vertical shaft with a tapered coupling part, a tape reel with a central tapered hole, a supporting disc and a friction layer, said supporting disc being freely rotatable on said shaft and bearing said friction layer on the upper side, the coupling part of said shaft being designed as a frusto-conical collar decreasing in diameter toward the upper end of said shaft, said hole of said tape reel being equally frusto-conical shaped, fitted to said collar surface and being supplied with an annular groove containing several balls of equal diameter engageable with said collar surface.

References Cited in the file of this patent

UNITED STATES PATENTS

| | | |
|---|---|---|
| 257,419 | Warrener | May 2, 1882 |
| 1,641,661 | Colman | Sept. 6, 1927 |
| 1,871,230 | Foster | Aug. 9, 1932 |
| 2,087,002 | Miehle | July 13, 1937 |
| 2,702,834 | Golle et al. | Feb. 22, 1955 |
| 2,854,199 | Boyer | Sept. 30, 1958 |
| 2,904,277 | Underwood | Sept. 15, 1959 |

FOREIGN PATENTS

| | | |
|---|---|---|
| 917,091 | France | Sept. 2, 1946 |